Aug. 6, 1929.   J. BUCHLI   1,723,720
VEHICLE RUNNING ON RAILS
Filed Aug. 15, 1927   3 Sheets-Sheet 2
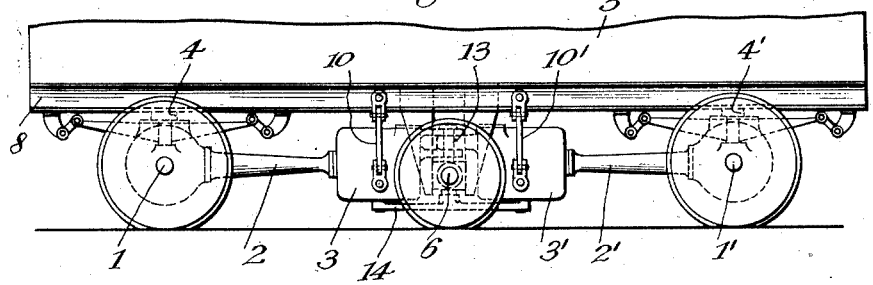
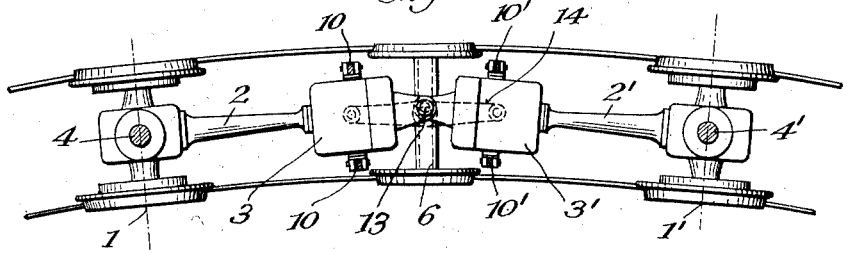
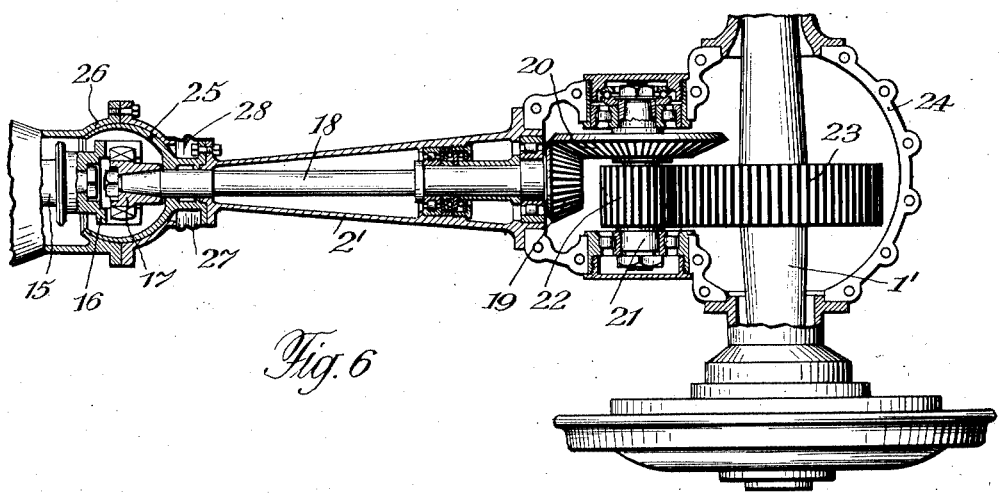
Inventor:
Jacob Buchli,
By Hemyworthy
atty.

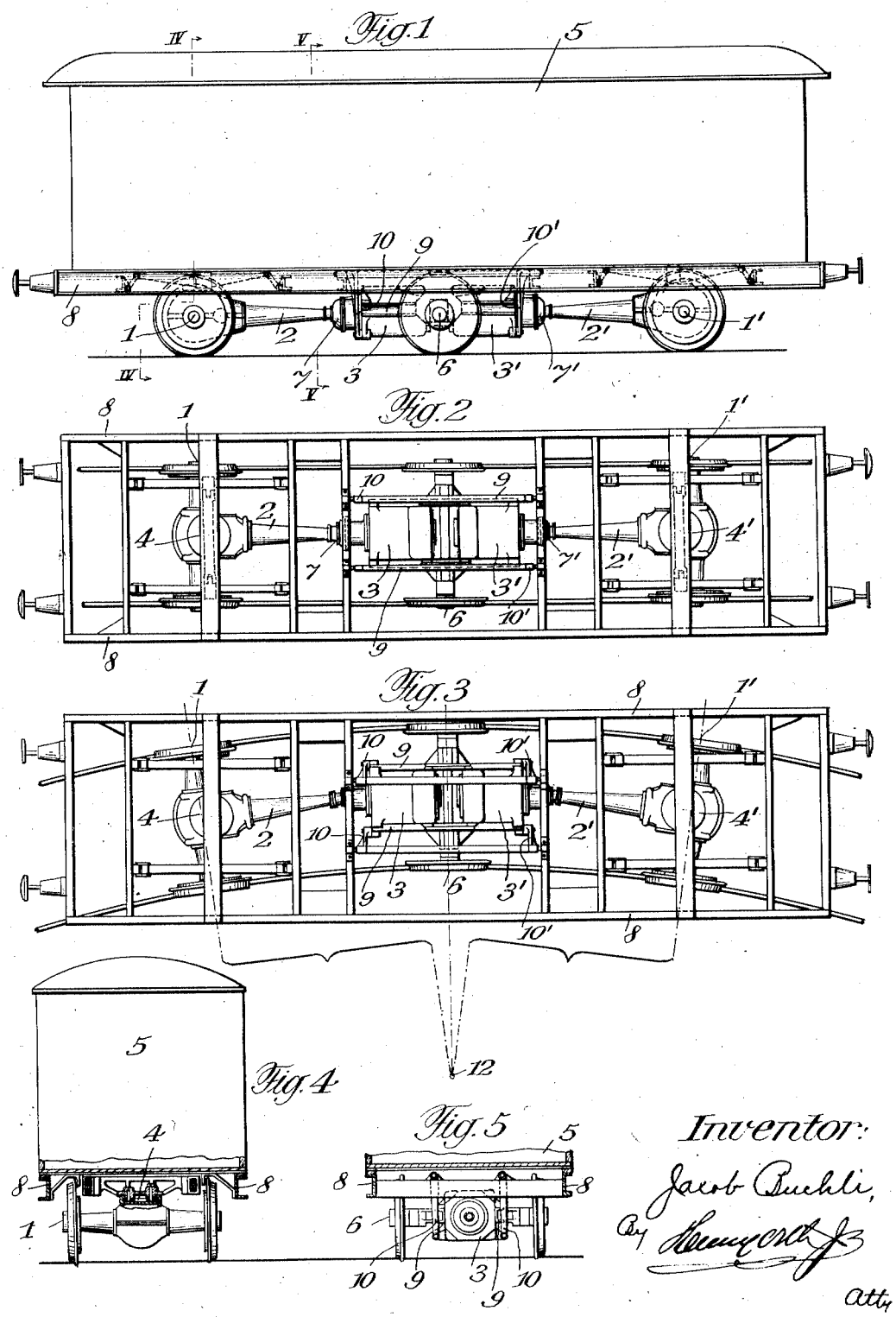

Aug. 6, 1929.  J. BUCHLI  1,723,720
VEHICLE RUNNING ON RAILS
Filed Aug. 15, 1927  3 Sheets-Sheet 3
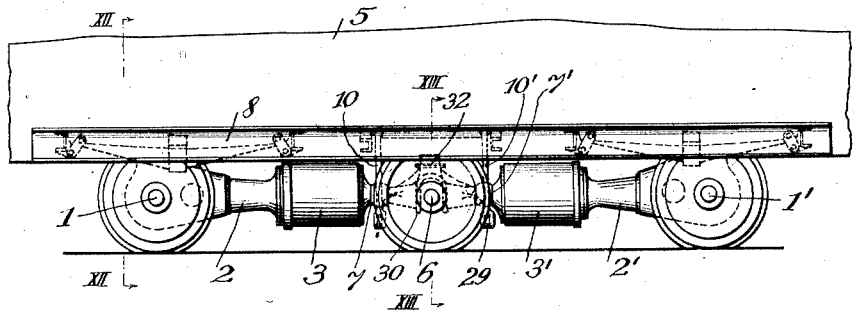
Fig.9
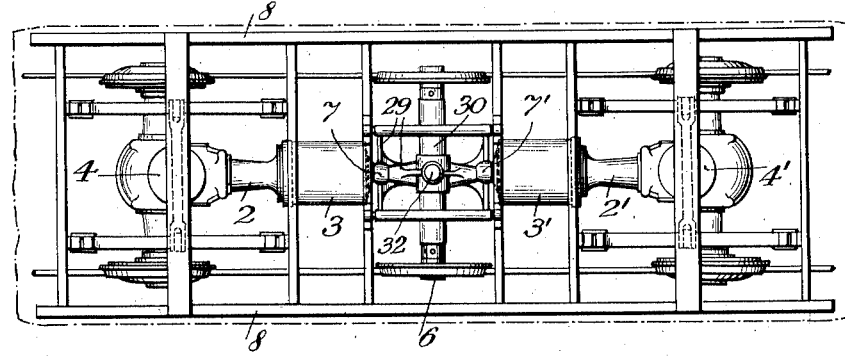
Fig.10
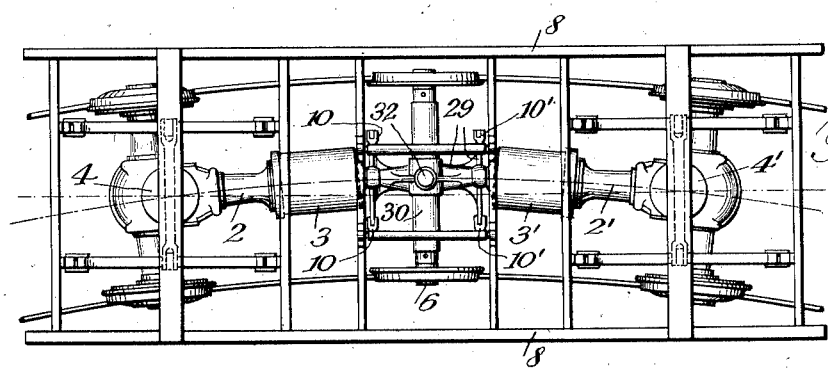
Fig.11
Fig.12  Fig.13
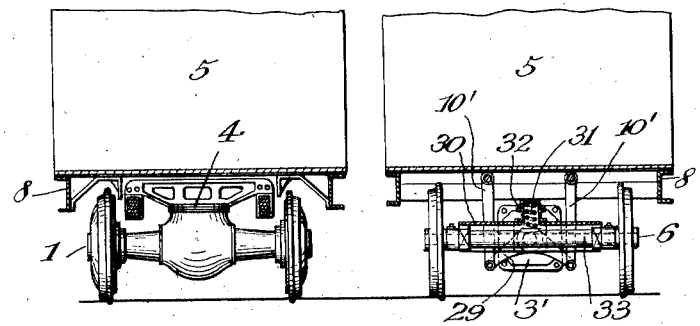
Inventor:
Jacob Buchli
By [signature]
Atty Patented Aug. 6, 1929.

1,723,720

UNITED STATES PATENT OFFICE.

JACOB BUCHLI, OF WINTERTHUR, SWITZERLAND.

VEHICLE RUNNING ON RAILS.

Application filed August 15, 1927, Serial No. 213,017, and in Germany January 10, 1927.

The present invention relates to improvements in vehicles running on rails and provided with two axles built as Bissel axles having radius bars. Sometimes it is desired to utilize the total friction or adhesion of the vehicle for traction purposes. This is obtained with motor driven rail vehicles by suspending the source of power from the main frame. The bogie is then suitably replaced by a single flexible or bogie axle whereby only the weight of this bogie axle has to be deducted from the weight which produces adhesion.

According to the present invention the bogie axle is guided in an intermediate frame or carrier system which is swingably suspended from the main frame so as to be movable transversely to the longitudinal axis of the vehicle and is always guided in the middle of the track by the bogie axle. On the carrier system or intermediate frame the motor or motors are supported.

Each end axle may be driven by a separate motor in which case both motors may be connected to each other by a pivot joint and suspended from the main frame. In this case each motor may be connected to its corresponding driving axle by means of a rigid shaft, no cardan shaft being required. The bogie axle is suitably connected with the means suspending the motor or with the main frame respectively.

Constructional examples of the subject matter of the present invention are diagrammatically illustrated on the accompanying drawings, in which:

Figs. 1–5 show a first constructional example and

Fig. 1 shows in elevation a vehicle having two driven axles, one bogie axle and two motors mounted on an auxiliary frame, Fig. 2 is a plan view of the substructure of Fig. 1, Fig. 3 is a plan view of the substructure with the parts shown in positions taken up when negotiating curves, Fig. 4 is a section along line IV—IV in Fig. 1, Fig. 5 is a section along line V—V in Fig. 1, Fig. 6 is a horizontal section through the cardan shaft utilized in the first constructional example, Fig. 7 is an elevation of a vehicle showing a modified embodiment of the invention, Fig. 8 is a plan view of the substructure of Fig. 7;

Figs. 9–13 show a further constructional example, of which

Fig. 9 is an elevation,

Fig. 10 a plan view of the parts in the position they occupy on a straight track, Fig. 11 a plan view of the parts in the position on negotiating a curve, Fig. 12 is a section along line XII—XII in Fig. 9 and Fig. 13 is a section along line XIII—XIII in Fig. 9.

Referring now to the constructional example illustrated in Figs. 1–5 the driving and supporting axles 1, 1' are pivotally connected by means of the radius bars 2, 2' to the motors 3 and 3' respectively. The vehicle body 5 rests on the axles 1, 1' pivot pins 4 and 4' being interposed between the body 5 and the axles 1 and 1' respectively. The pivotal connection between the radius bars 2, 2' and the motors 3, 3' is formed by the universal joints 7 and 7' respectively. The motors 3 and 3' are mounted on an intermediate frame 9 which, by means of links 10 and shafts 11 is suspended from the main frame so as to be swingable at right angles to the longitudinal axis of the vehicle. The bogie axle or flexible axle 6 has its bearings provided in the frame 9. These bearings are so constructed that the axle is free to move in the vertical direction relatively to the frame 9 but is not displaceable in the axial direction relatively to the frame. Thus on negotiating curves the axle 6 causes the frame 9 to swing out of its normal position and to cause thereby the end axles 1 and 1' to swivel about their pivot pins 4 and 4' so that these axles take up a radial position, their centre lines passing through the centre 12 of the curve as is shown in Fig. 3. The longitudinal centre plane of the frame 9 which when traveling along a straight track passes through the centre line of the track is a tangential plane to said centre line of the track when negotiating curves.

The means connecting a motor to a driving axle are shown in detail in Fig. 6. On the motor shaft 15 one half of a universal clutch 16 is fixed and the other half 17 is mounted on one end of the shaft 18 which carries on its other end a bevel wheel 19 in mesh with a bevel wheel 20 fixed to a countershaft 21 that is parallel to the driving axle 1'. A pinion 22 fixed on the countershaft 21 cooperates with a large gear wheel 23 fixed to the axle 1'. Bevel gears 19 and 20, countershaft 21 and spur gear wheels 22 and 23 are enclosed in a casing 24 which is split in a horizontal plane. The casing 24 is fixed to the conical casing 2' acting as radius bar and the pivot joint between the latter and the motor is effected by means of a spherical member 25 connected to the casing 2' and enclosed in a spherical socket 26 fixed to the motor casing, 27 denoting a cover of a flexible material which permits a universal displacement of the parts 25 and 26 and encloses a chamber 28 filled with a lubricant for lubricating said parts. The ratio of the bevel gearing and of the spur gearing is so chosen that the speed of the electric motor is suitably reduced for driving the axle 1'.

In the constructional example illustrated in Figs. 7 and 8 the radius bars 2 and 2' are rigidly connected to the motors 3 and 3' respectively, the spherical joints 7 and 7' being done away with and replaced by a pivot 13 arranged on the point of intersection of the two radius bars and around which the two motors are adapted to swing. The two motors 3 and 3' are suspended by means of links 10 and 10' respectively from the main frame 8. A connecting piece or frame 14 is pivoted to the two motors and to the bogie axle 6 and causes the transverse displacement of the motors to adjust the driving axles 1 and 1' when the vehicle negotiates a curve.

The constructional example illustrated in Figs. 9–13 differs from that shown in Figs. 1–5 inasmuch as the spherical joints 7 and 7' are not arranged between the driving axles and the motors but on the remote side of the motors. The joints 7 and 7' form part of an auxiliary frame or a structure 29 suspended from the main frame 8 by means of links 10 and 10' adapted to swing at right angles to the longitudinal axis of the vehicle. The structure 29 comprises a guiding member 30 extending in the longitudinal direction of the bogie axle 6 and permitting a displacement of the latter in the vertical direction but not in the axial direction. A spring 31 is interposed between a sleeve 33 surrounding the bogie axle 6 and an extension 32 of the member 30 which tends to press the bogie axle 6 on the rails for preventing a derailing. The manner of operation is otherwise similar to that of the embodiment shown in Figs. 1–3 and Fig. 10 illustrates the position of the parts when the vehicle travels along a straight track and Fig. 11 on negotiating a curve in which case the auxiliary frame 29 is swung out of its normal position and causes the axles 1 and 1' to adjust themselves radially to the curve.

I claim:

1. In a rail vehicle in combination with a main vehicle frame; an auxiliary frame suspended from the main frame to have movement transverse of the main frame, a bogie axle mounted on said auxiliary frame to cause the transverse movement of the auxiliary frame, an end driving axle, a radius bar interposed between the end axle and said auxiliary frame, a driving shaft movable with said bar, and a bodily movable motor connected to said driving axle and moved in response to the movement of said auxiliary frame.

2. In a rail vehicle, in combination, a mainframe, two end axles supporting said mainframe and permitting of a radial adjustment, an auxiliary frame below and suspended from said main frame and adapted to swing at right angles to the longitudinal axis of the vehicle, a bogie axle mounted on said auxiliary frame and adapted to cause the transverse displacement of said auxiliary frame on negotiating curves, at least one motor mounted on said auxiliary frame, a driving connection between said motor and at least one of said end axles which driving connection includes a longitudinal shaft and gear wheels, and radius bars interposed between said end axles and said intermediate frame radially adjusting said end axles.

3. In a rail vehicle, in combination, a mainframe, two end axles supporting said main frame and permitting of a radial adjustment, an auxiliary frame suspended from said main frame and adapted to swing at right angles to the longitudinal axis of the vehicle, a bogie axle mounted on said auxiliary frame and adapted to cause the transverse displacement of said auxiliary frame on negotiating curves, two motors mounted on said auxiliary frame for separately driving said end axles, a driving connection interposed between each motor and its end axle, radius bars interposed between said end axles and said motors for radially adjusting said end axles, and rigidly fixed to said motors, and pivot means arranged in the point of intersection of the axes of said radius bars and operatively connecting said two motors together.

4. In a rail vehicle in combination with a main vehicle frame; an auxiliary frame suspended from the main frame, for transverse movement, a bogie axle mounted on the auxiliary frame to cause transverse movement thereof, end axles, radius bars for the end axles including a driving shaft, and driving gears between the shafts and end axles, and bodily movable motors supported by the auxiliary frame.

5. In a rail vehicle in combination with a main frame; swingable end axles, a bogie between them mounted for movement transverse of the main frame, radius arms for each end axle, electric motors mounted to swing transversely beneath the main frame, means pivoting one end of the motors to the bogie axle, radius rods connected to the end axles and rigidly connected to the other end of the motors, and driving connections between the motors and end axles.

6. In a rail vehicle in combination with a main frame; swingable end axles, a bogie axle between them mounted for movement transverse of the main frame, motors pivoted together and on the bogie axle, means to suspend the motors beneath the main frame, radius bars connected to the motors, driving connections between the end axles and motors, and an auxiliary frame for the motors and bogie axle.

In testimony whereof, I have signed my name to this specification.

JACOB BUCHLI.